Dec. 25, 1923.　　　　　J. S. HOBSON　　　　　1,478,390

BATTERY RECEPTACLE

Filed June 5, 1922

Inventor
John S. Hobson
Williams Bradbury
McCaleb & Pierce Attys.

Patented Dec. 25, 1923.

1,478,390

UNITED STATES PATENT OFFICE.

JOHN S. HOBSON, OF CHICAGO, ILLINOIS, ASSIGNOR TO MASSEY CONCRETE PRODUCTS CORPORATION, OF CHICAGO, ILLINOIS, A CORPORATION OF VIRGINIA.

BATTERY RECEPTACLE.

Application filed June 5, 1922. Serial No. 566,017.

*To all whom it may concern:*

Be it known that I, JOHN S. HOBSON, a citizen of the United States, and resident of Chicago, in the county of Cook and State of Illinois, have invented certain new and useful Improvements in Battery Receptacles, of which the following is a full, clear, concise, and exact description, reference being had to the accompanying drawings, forming a part of this specification.

This invention relates to battery receptacles and wells such as are employed for storing the batteries used in connection with semaphore and other systems, and it more particularly relates to means provided in association with the cover by means of which the well is sealed whenever the cover is in position.

In battery wells, it is very desirable to provide means for tightly closing or sealing the well when the cover is in place, and it is desirable that the packing means or gasket used for this purpose shall be of such a character as to provide for slight irregularities in the edge of the well and surface of the cover.

It is further desirable to provide for this purpose means which will not rapidly deteriorate and which will not adhere to the surfaces of the well and cover and thus interfere with the removal of the cover or cause the destruction of the gasket when the cover is removed.

As the workmen are often careless in removing and replacing the covers of the battery wells, it is particularly desirable to provide means for securely maintaining the gasket in position within the cover.

Referring now to the drawings.

Figure 1:
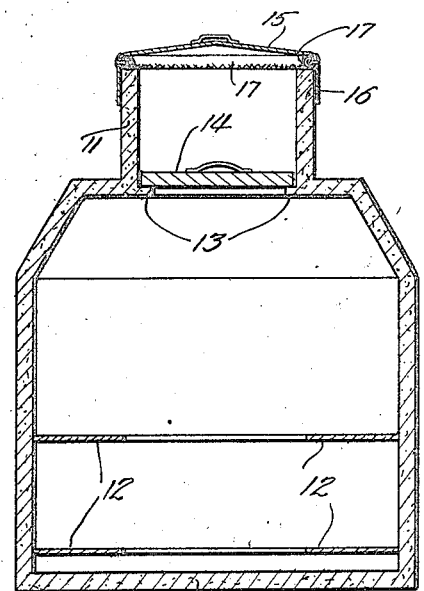
Figure 1 is a vertical sectional view through a battery well with the cover thereon.
Figure 3:
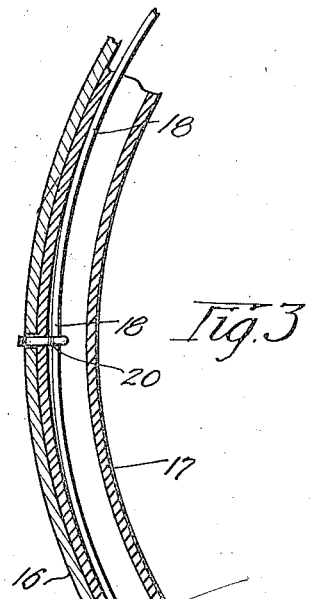
Figure 3 is a transverse sectional view through a portion of the cover and gasket of applicant's invention, showing the means for retaining the gasket in position.
Figure 2:
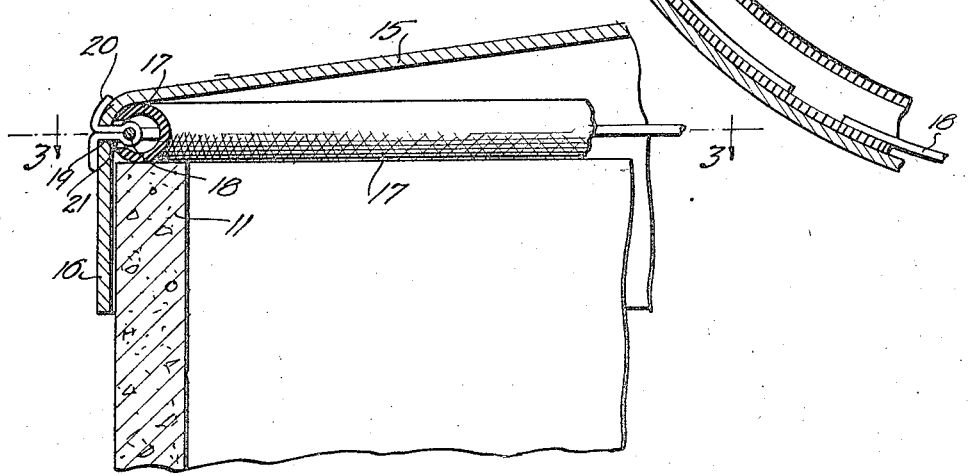
Figure 2 is a vertical sectional view through a portion of the cover and the adjacent edge of the battery well.

Referring now to the drawings, in which like reference characters indicate like parts in the several views, 10 indicates a battery well which preferably is of concrete. The well 10 terminates at the upper end thereof in the annular flange 11 and is provided with shelves 12 on which the batteries may be placed. Adjacent to the lower edge of the flange 11, the well is provided with an inwardly directed flange 13 upon which is supported an inner cover member 14 of wood or any other desired material.

Arranged over the opening within the annular flange 11 is a metal cover 15 provided with a downwardly extending flange 16 arranged to enclose the upper edge of the flange 11. Within the cover 15 at the angle where the flange 16 joins the top portion is a strip of canvas covered rubber tubing or hose 17 which extends about the inner side of the flange and has its ends abutting. Within the tubing 17 is a spring rod 18 which has its ends overlapped or nearly abutting. The rod 18 is substantially circular and is of a size such that it acts through its resiliency to firmly press the tubing 17 against the depending flange 16 of the cover.

The flange 16 adjacent to the top of the cover is provided with a series of openings 19 through which extend the legs of the cotter pins 20, the loops of which are positioned about the rod 18, openings 21 being provided in the tubing 17 to permit of the passage therethrough of the cotter pins 20. The cotter pins 20 act to maintain the tubing adjacent to the top of the cover. Only a limited number of cotter pin supports are necessary, preferably not more than four or five being provided.

The tubing 17 being hollow and readily compressible, it adapts itself to all the irregularities in the upper edge of the flange 11 or in the cover member 15. As it is of hose type construction, it does not deteriorate rapidly as do the ordinary felt gaskets sometimes employed, and as it is canvas covered, it does not adhere to the surfaces against which it is pressed, as do the rubber gaskets sometimes employed.

It is to be understood that applicant contemplates certain slight modifications in the details of the arrangement herein disclosed and the invention is, therefore, to be limited merely by the scope of the appended claims.

Having now described my invention, what I claim is new and desire to secure by Letters Patent of the United States is:

1. In a cover of the character described, a central portion, a substantially cylindrical flange extending therefrom, a gasket comprising a section of hose or tubing within said flange adjacent to said central portion, means within said tubing for forcing it against said flange, and means for securing said section of hose in position.

2. In a cover of the character described, a central portion, a substantially cylindrical flange extending thereform, a gasket comprising a section of hose or tubing within said flange adjacent to said central portion, and a rod within said tubing arranged to maintain said tubing in engagement with said flange.

3. In a cover of the character described, a central portion, a substantially cylindrical flange extending therefrom, a gasket comprising a section of hose or tubing within said flange adjacent to said central portion, a rod within said tubing arranged to maintain said tubing in engagement with said flange, and means secured to said rod and flange and passing through said tubing for securing said gasket in position.

4. In a cover of the character described, a central portion, a substantially cylindrical flange extending therefrom, a gasket comprising a section of canvas covered rubber hose or tubing within said flange adjacent to said central portion, a rod within said tubing arranged to maintain said tubing in engagement with said flange, cotter pin-like devices having their looped portions positioned about said rod, and the legs thereof extending through said tubing and flange and expanded laterally so as to maintain said gasket in position.

In witness whereof, I hereunto subscribe my name this 31st day of May, 1922.

JOHN S. HOBSON.

Witnesses:
C. E. ARNOLD,
J. DAVID DICKINSON.